(12) United States Patent
Wälde et al.

(10) Patent No.: US 10,886,624 B2
(45) Date of Patent: Jan. 5, 2021

(54) WAVEGUIDE COUPLING CONFIGURATION FOR A LINE SCANNER

(71) Applicant: VEGA Grieshaber KG, Wolfach (DE)

(72) Inventors: Steffen Wälde, Niedereschach (DE); Daniel Schultheiss, Hornberg (DE)

(73) Assignee: VEGA Grieshaber KG, Wolfach (DE)

( * ) Notice: Subject to any disclaimer, the term of this patent is extended or adjusted under 35 U.S.C. 154(b) by 468 days.

(21) Appl. No.: 15/579,054

(22) PCT Filed: Jun. 18, 2015

(86) PCT No.: PCT/EP2015/063743
§ 371 (c)(1),
(2) Date: Jun. 14, 2018

(87) PCT Pub. No.: WO2016/202394
PCT Pub. Date: Dec. 22, 2016

(65) Prior Publication Data
US 2018/0287264 A1    Oct. 4, 2018

(51) Int. Cl.
| | |
|---|---|
| *H01Q 21/00* | (2006.01) |
| *H01Q 1/22* | (2006.01) |
| *H01Q 21/08* | (2006.01) |
| *G01B 15/04* | (2006.01) |
| *G01F 23/284* | (2006.01) |
| *H01Q 19/19* | (2006.01) |
| *H01P 5/107* | (2006.01) |

(52) U.S. Cl.
CPC ......... *H01Q 21/0037* (2013.01); *G01B 15/04* (2013.01); *G01F 23/284* (2013.01); *H01Q 1/225* (2013.01); *H01Q 21/08* (2013.01); *H01P 5/107* (2013.01); *H01Q 19/19* (2013.01)

(58) Field of Classification Search
CPC .... H01Q 21/0037; H01Q 21/08; H01Q 1/225; H01Q 19/19; G01B 15/04; G01F 23/284; H01P 5/107
USPC ......................................................... 342/124
See application file for complete search history.

(56) References Cited

U.S. PATENT DOCUMENTS

| | | |
|---|---|---|
| 6,061,035 A | 9/2000 | Kinasewitz et al. |
| 7,728,772 B2 | 6/2010 | Mortazawi |
| 2004/0150554 A1 | 8/2004 | Stenger |

FOREIGN PATENT DOCUMENTS

| | | |
|---|---|---|
| CN | 101492750 A | 7/2009 |
| DE | 2533179 | 2/1977 |
| DE | 102012106938 | 1/2014 |

OTHER PUBLICATIONS

International Search Report for International Application No. PCT/EP2015/063743 dated Feb. 17, 2016.
(Continued)

*Primary Examiner* — Frank J McGue
(74) *Attorney, Agent, or Firm* — Hunton Andrews Kurth LLP

(57) ABSTRACT

Exemplary waveguide coupling configuration can be provided for a fill level radar antenna, e.g., in the form of a line scanner. The exemplary waveguide coupling configuration can include a waveguide openings on the antenna side which can have a distance from one another that can correspond to less than or equal to one half of the wavelength of the transmission signal. For example, the distance between adjacent radiator elements can be greater than one half of the wavelength of the transmission signal. In this exemplary manner, more space can be provided for a front end on the printed circuit board.

13 Claims, 6 Drawing Sheets

(56) References Cited

OTHER PUBLICATIONS

International Written Opinion for International Application No. PCT/EP2015/063743 dated Feb. 17, 2016.
Chinese Office Action dated Jan. 21, 2020 for Chinese Patent Application No. 201580080216.6.
International Preliminary Report on Patentability for International Application No. PCT/EP2015/063743 dated Dec. 19, 2017.

WAVEGUIDE COUPLING CONFIGURATION FOR A LINE SCANNER

RELATED APPLICATION(S)

The present application is a national phase of International Application No. PCT/EP2015/063743 filed on Jun. 18, 2015, which published as International Patent Publication WO 2016/202394 on Dec. 22, 2016, the entire disclosures of which are incorporated herein by reference.

FIELD OF THE DISCLOSURE

The present disclosure relates generally to three-dimensional fill level measurement configuration. In particular, the present disclosure relates to a waveguide coupling configuration for a fill level radar antenna, which may be or include a line scanner, to a fill level radar antenna comprising a corresponding waveguide coupling, and to a fill level measurement device comprising a fill level radar antenna.

BACKGROUND INFORMATION

New objectives are emerging in the field of three-dimensional fill level measurement using radar measuring devices. Previously, when measuring bulk material, only a gross measured value of the actual fill level could be determined. However, three-dimensional fill level measurement avails a possibility of detecting the volume and mass of the bulk material contained in a container.

A detection of a surface topology can be advantageous in determining fill levels or volumes in moving liquids. Such movement of liquids may, for example, occur when using stirrers and from the flow patterns generated therefrom on the liquid surface ("waterspouts"). Determining the surface topology can also allow conclusions to be drawn regarding additional variables, such as the viscosity or the degree of mixing of the filling material.

In order to detect the surface topology, the filling material surface can be sampled using a measurement beam. For example, a one-dimensional array including a plurality of radiator elements can be used to control the measurement beam, which array allows one-dimensional sampling of the filling material surface ("line scanner"). Moreover, if such array is rotated, the surface may be sampled two-dimensionally.

Accordingly, there may be a need to address and/or overcome at least some of the shortcoming described herein.

SUMMARY OF EXEMPLARY EMBODIMENTS

One of the objects of the present disclosure can be to provide a small antenna design together with effective focusing of the transmission signal.

Thus, according to one exemplary embodiment of the present disclosure, a waveguide coupling configuration can be provided for a fill level radar antenna, which can comprise a plurality of radiator elements and an arrangement of a plurality of waveguides. Each of the radiator elements can be configured to transmit and/or receive a radar signal, and/or each of the radiator elements can be associated with one or more of the waveguides.

The corresponding exemplary radiator element can transmit a transmission signal that can be coupled into the waveguide, which can then forward and/or transmit the coupled-in transmission signal to an antenna element of an antenna assembly when the antenna assembly is connected to the waveguide coupling.

The exemplary antenna assembly can comprise a plurality of antenna elements, and each of such exemplary antenna elements can be designed and/or configured to emit and/or receive the corresponding radar signal. For example, using digital beamforming methods, the direction in which the antenna "sees" can be set, and therefore the filling material surface can be sampled along a line (e.g., in the case of a one-dimensional array of the radiator elements) or two-dimensionally (e.g., in the case of a two-dimensional array of the radiator elements).

Each of the waveguides can comprise a waveguide opening arranged on the antenna side in order to emit the coupled-in transmission signal into the antenna or a forwarding waveguide connected thereto.

In one exemplary embodiment of the present disclosure, the maximum distance between two adjacent waveguide openings arranged on the antenna side can be, for example, less than or equal to one half of the wavelength of the transmission signal. The center frequency of the transmission signal can be, e.g., approximately or exactly 79 GHz, which can correspond to a wavelength of approximately 3.8 mm, and therefore the maximum distance can be, e.g., 1.9 mm.

Each of the radiator elements can be connected to a distinct electronics unit which can generate the radar signals to be emitted (e.g., by the antenna), and/or further process the radar signals received (e.g., by the antenna). The electronics unit can be connected to the corresponding radiator element via, e.g., a microstrip line, and/or can have a dimension that is greater than, e.g., one half of the wavelength of the transmission signal.

According to another exemplary embodiment of the present disclosure, the distance between adjacent radiator elements can be greater than the distance between two adjacent waveguide openings on the antenna side, and is for example greater than one half of the wavelength ($\lambda/2$) of the transmission signal.

For example, the distance between adjacent radiator elements can be twice as great as the distance between adjacent waveguide openings on the antenna side.

In this exemplary manner, even in proportionally large electronics units, it is possible to achieve small distances between the individual waveguide openings facing the antenna.

According to a further exemplary embodiment of the present disclosure, every second radiator element can be arranged along a first straight line. In contrast or in addition, the remaining radiator elements can be arranged along a second line extending in parallel with the first line. The distance between the two lines can, for example, be within the range of a single wavelength of the transmission signal. This exemplary distance can also be larger or smaller. Due to this exemplary misalignment, space can be provided for the electronics units, which can be also referred to as "HF" front ends.

It is also possible to arrange only every third, fourth, etc. radiator element along a first straight line, the next third or quarter of radiator elements along a second line, and the next third or quarter of radiator elements along a third line, etc. In the case of four groups of the radiator elements, e.g., the last quarter of radiator elements can be arranged along a fourth line, all three or four lines extending in parallel, and having a significant distance from one another so that there is sufficient space for the electronics units.

According to a still further exemplary embodiment of the present disclosure, the radiator elements can be at least partially arranged on different planes with respect to one another. For example, the first line can be located on a first plane (e.g., on a first substrate) and the second line is located on a second plane, which can lie thereabove or thereunder (e.g., on a second substrate). As a result, additional space can be provided for the electronics units.

According to a yet another exemplary embodiment of the present disclosure, the waveguide openings on the antenna side can be arranged along an additional line, which can be positioned in another plane and is typically positioned above and centrally between the first two lines.

According to a yet further exemplary embodiment of the present disclosure, at least one of the waveguides (or many or all of the waveguides) can have a curved or angular shape, such that the radiator element associated with the waveguide is likely not arranged directly below (or above) the waveguide opening on the antenna side, and instead can be laterally offset with respect thereto.

According to an additional exemplary embodiment of the present disclosure, all the waveguides can have identical lengths, and therefore identical electronics units can be used.

According to yet another exemplary embodiment of the present disclosure, all the waveguides can have the same shape.

The waveguides can be used as interfaces for connecting the horn antennas, the parabolic troughs or other focusing apparatuses.

The transmission signals from a plurality of mutually offset radiator elements can thus be brought together along a line using, e.g., a waveguide network. The use of rectangular waveguides can be advantageous in this respect. However, circular waveguides and/or waveguides having other cross sections can also be used.

When using rectangular waveguides, the waveguide openings can be arranged such that the narrow sides of the waveguide are arranged in a line, in order to be able to provide as little distance as possible between the waveguides. In other words, the broader sides of the waveguide openings can be arranged so as they are adjacent to one another.

In a further exemplary embodiment of the present disclosure, a fill level radar antenna can be provided that can comprise a waveguide coupling as described herein, and as follows. For example, the fill level radar antenna can include or can be, for example, a horn radiator array antenna. According to still another exemplary embodiment of the present disclosure, the antenna can also be or include a parabolic trough.

According to a further embodiment of the present disclosure, the fill level radar antenna can be or include a one-dimensional array antenna ("line scanner"). According to a still further exemplary embodiment of the present disclosure, the fill level radar antenna can be or include a two-dimensional array antenna, and therefore the filling material surface can be sampled two-dimensionally, e.g., without the antenna having to rotate in the process.

According to another exemplary embodiment of the present disclosure, a fill level measurement device having a fill level radar antenna can be provided as described herein, and as follows. For example, the fill level measurement device can be, for example, designed or configured to determine a topology of a filling material surface.

These and other objects, features and advantages of the exemplary embodiments of the present disclosure will become apparent upon reading the following detailed description of the exemplary embodiments of the present disclosure, when taken in conjunction with the appended drawings and claims.

BRIEF DESCRIPTION OF THE DRAWINGS

Further objects, features and advantages of the present disclosure will become apparent from the following detailed description taken in conjunction with the accompanying figures showing illustrative embodiments of the present disclosure, in which.

Figure 1:
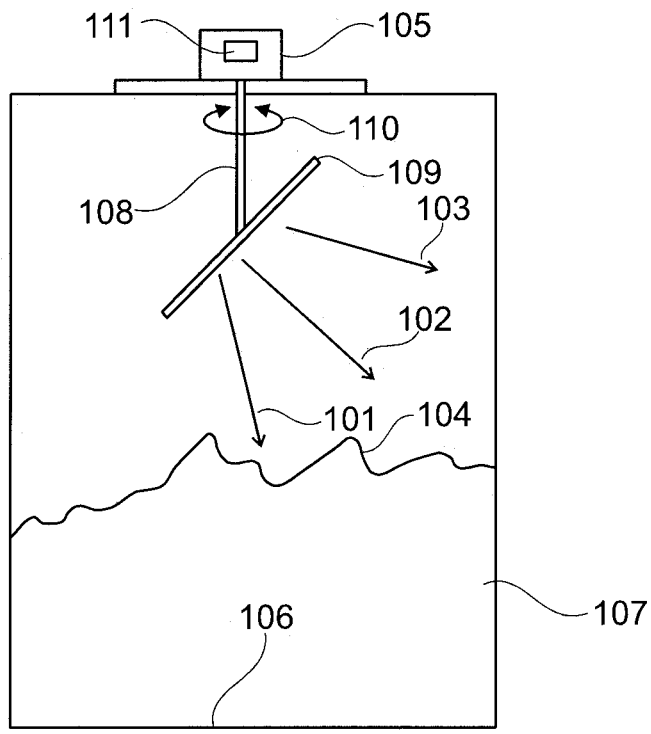
FIG. 1 is a side view of a fill level measurement device according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims. The drawings are merely schematic and are not necessarily provided to scale.

DETAILED DESCRIPTION OF EXEMPLARY EMBODIMENTS

FIG. 1 shows a topology-detecting fill level measurement device 105, for example, in the form of a fill level radar measurement device, which can comprise the fill level radar antenna as described herein according to an exemplary embodiment of the present disclosure. The exemplary measurement device 105 can be configured to detect echo signals or echo curves from different angular ranges 101, 102, 103. For each detected echo curve, the distance from the relevant point on the surface of the filling material or bulk material 104 can be determined. By numerically integrating these distance values and postulating a planar surface 106 below the bulk material, or when the container geometry is known, the volume of the bulk material stockpile 107 can be determined. In addition, e.g., when the density is known, the bulk material mass can be calculated.

The exemplary fill level measurement device 105 can comprise an antenna support 108 for fastening an antenna assembly 109 (e.g., a fill level radar antenna). Depending on the configuration of the exemplary fill level measurement device 105, the antenna support 108 can facilitate the main radiation direction of the antenna to be mechanically adjusted, for example, by a rotation 110 and/or tilting. Furthermore, the fill level measurement device 105 can be designed or configured to implement digital beamforming. In this exemplary manner, the fill level measurement device 105 can comprise an antenna assembly 109 including, e.g., a plurality of transmission and/or receiving elements, and an appropriate analysis computer unit 111 for implementing an exemplary digital beamforming method/procedure.

Figure 2:
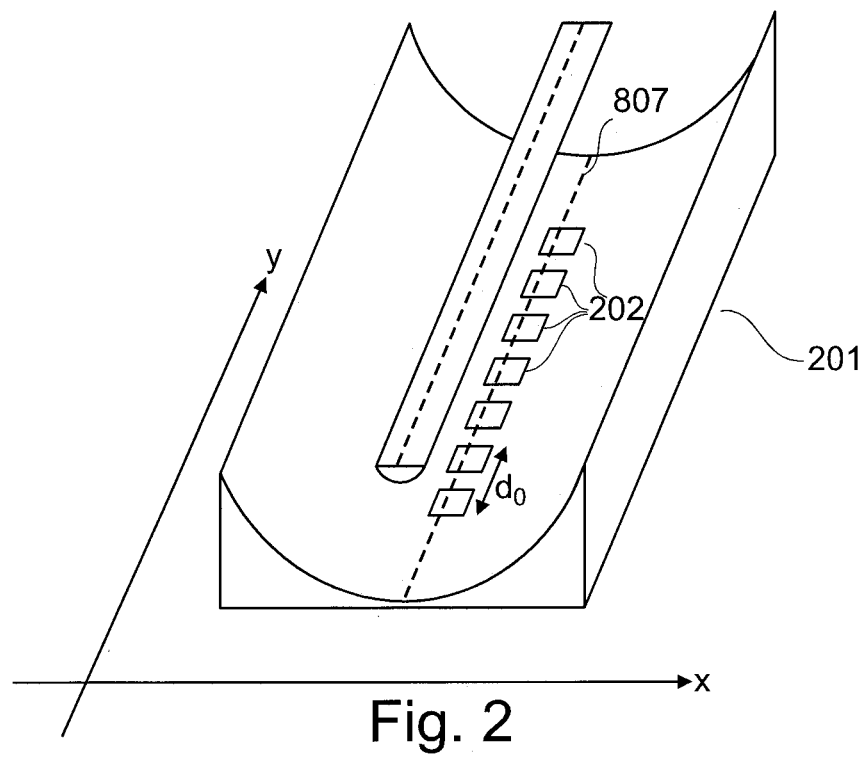
FIG. 2 is perspective view of a parabolic trough according to an exemplary embodiment of the present disclosure.

FIG. 2 shows an antenna assembly for topology-detecting fill level measurement according to an exemplary embodiment of the present disclosure. In combination with a rotatable support 108 (see, e.g., FIG. 1), for example, a parabolic trough 201 can be used. The parabolic trough 201 can focus the electromagnetic waves emitted and/or received by the antenna elements 202 in the x-direction (e.g., a transverse direction). In contrast, the corresponding signals can be focused in the y-direction (e.g., longitudinal direction) after the received signals have been detected in the analysis computer unit 111 (see, e.g., FIG. 1) by digital beamforming (DBF). This exemplary configuration/procedure can facilitate the targeted control of the main receiving direction of the antenna assembly in the y-direction.

In combination with a static support 108, a two-dimensional antenna assembly can be used which can comprise a plurality of transmission and/or receiving elements distributed in both the x- and y-direction. The exemplary analysis computer unit 111 can combine the signals received by the transmission/receiving elements according to the two-dimensional digital beamforming method, and can, in this exemplary, induce a targeted deflection of the main receiving direction along both the x- and y-axis.

In order to avoid grating lobes during the digital beamforming, the physical distance between two adjacent antenna elements 202 should be less than or equal to one half of the wavelength of the radar signals used. This exemplary preference can lead to a use of a large number of antenna elements, and thus to a high degree of circuit complexity and correspondingly high production costs of the radar device.

Figures 3A, 3B:
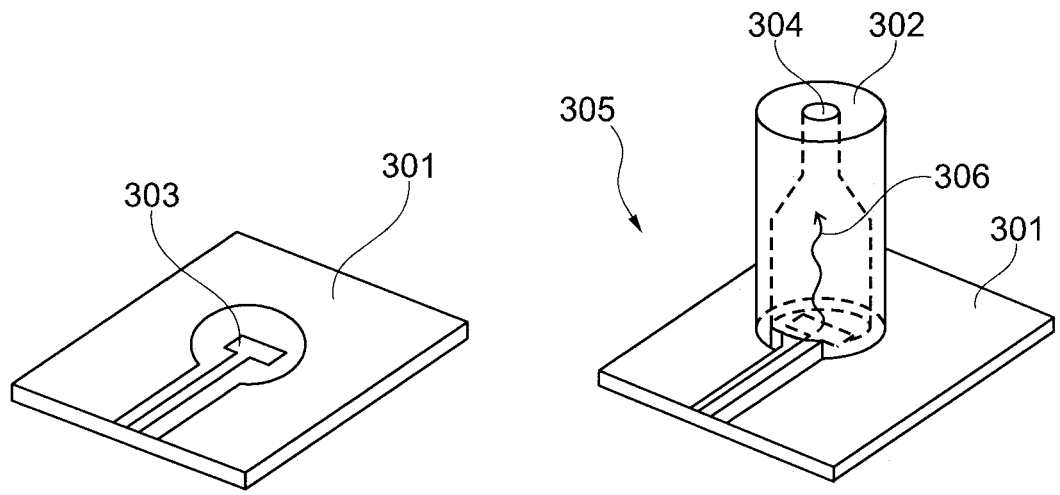
FIG. 3a is an illustration of a planar radiator element on a printed circuit board according to an exemplary embodiment of the present disclosure.
FIG. 3b is an illustration of a waveguide coupling according to an exemplary embodiment of the present disclosure.

FIGS. 3a and 3b show the schematic construction of a waveguide transition 305 between a radiator element 303 arranged on a printed circuit board 301 and a waveguide 302 according to an exemplary embodiment of the present disclosure. Using the waveguide 302, the electromagnetic waves 306 which are transmitted by the radiator element 303, and which reproduce the radar signal generated by the HF front end and guided to the transmission element 303 via a microstrip line, can be directed to the antenna assembly (not shown). The signals received by the exemplary antenna assembly can also be supplied to the electronics unit by the waveguide. A waveguide transition 305 of this exemplary type can be used for conventional, radar-based fill level measurement, in which, e.g., the radar device comprises only one antenna.

Using the planar patch antenna of the radiator element 303, an alternating electromagnetic field can be coupled into the opening in the waveguide on the circuit board side, whose opening can be perpendicular to the normal of the circuit board. The inner cross section 304 of the waveguide can be (in such exemplary case) circular or rectangular, and/or it can have any other geometries. For example, another geometry, such as a line stub, can be used instead of a patch antenna. Additional designs for improving the coupling to the waveguide are usable according to an exemplary embodiment of the present disclosure, such as, e.g., perpendicular pin and additional resonators on the lower face of the circuit board.

Figure 4:
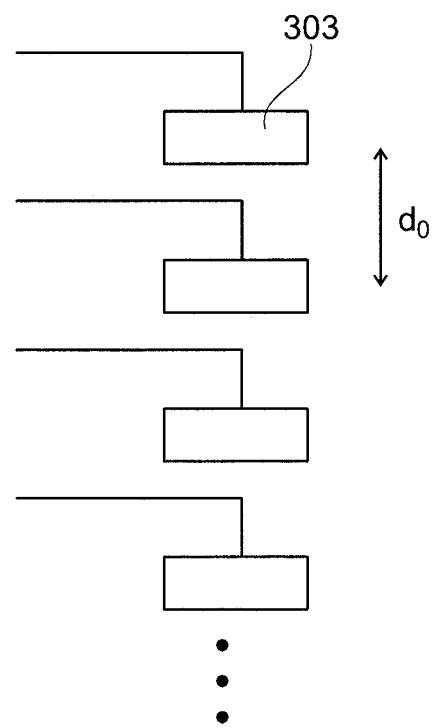
FIG. 4 is an illustration of a plurality of radiator elements arranged along a straight line according to an exemplary embodiment of the present disclosure.

FIG. 4 shows an arrangement of a plurality of radiator elements 303 along a straight line. The distance between adjacent radiator elements can be $d_0$, for example $\lambda/2$.

Figure 6:
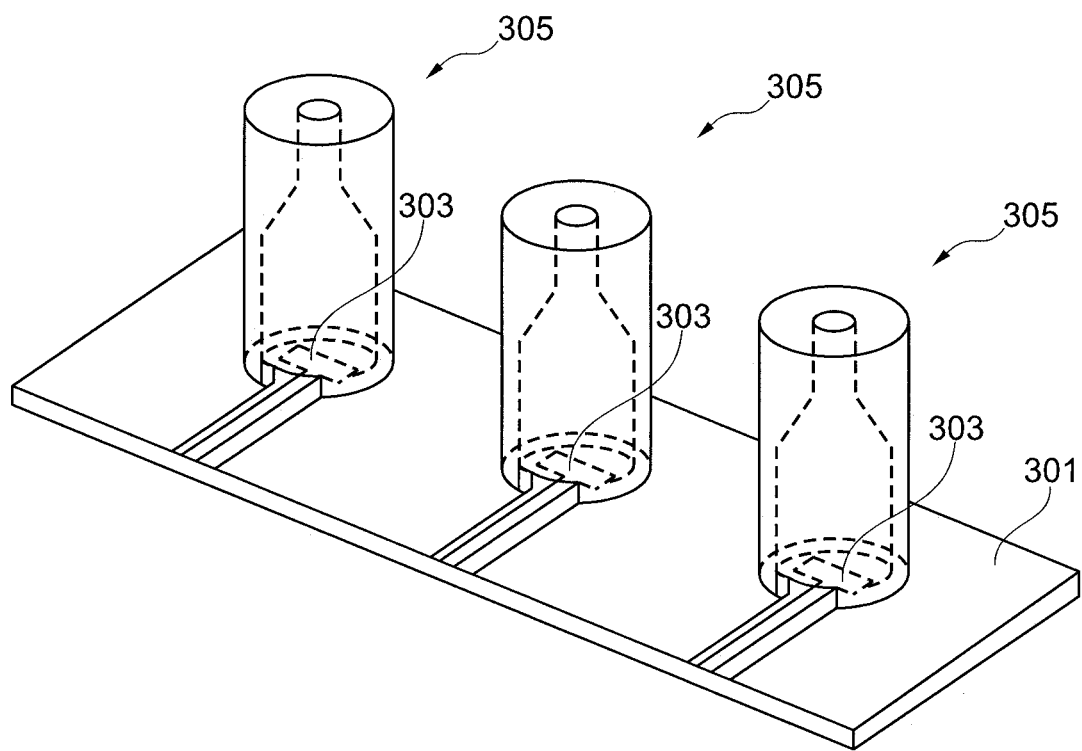
FIG. 6 is an illustration of a waveguide coupling according to yet another exemplary embodiment of the present disclosure.

If an antenna line array is to be provided, using which the filling material surface can be sampled along a line using digital beamforming, the waveguide coupling, as shown in FIG. 6, can be arranged, e.g., along a straight line. In this exemplary manner, a non-planar array antenna 201 (see, e.g., FIG. 2) can be connected to a high-frequency front end. According to the exemplary embodiment of the present disclosure shown in FIG. 6, the radiator elements 303 can be provided in the form of patch antennas. Other exemplary radiator elements, such as a line stump or a perpendicular pin, can also be used. Likewise, in order to improve the coupling, resonators can be used on the lower face of the printed circuit board, or, e.g., the waveguides can be fed from the lower face of the printed circuit board.

Since the above-described exemplary printed circuit board waveguide transitions 305 can have a large spatial expansion for the wavelength lambda, it is possible to provide more space for housing the electronics units by using waveguides which can be provided for this exemplary purpose. In this exemplary manner, even in proportionally large electronics units, it is possible to arrange the waveguide openings at a distance of less than or equal to $\lambda/2$.

Figure 5:
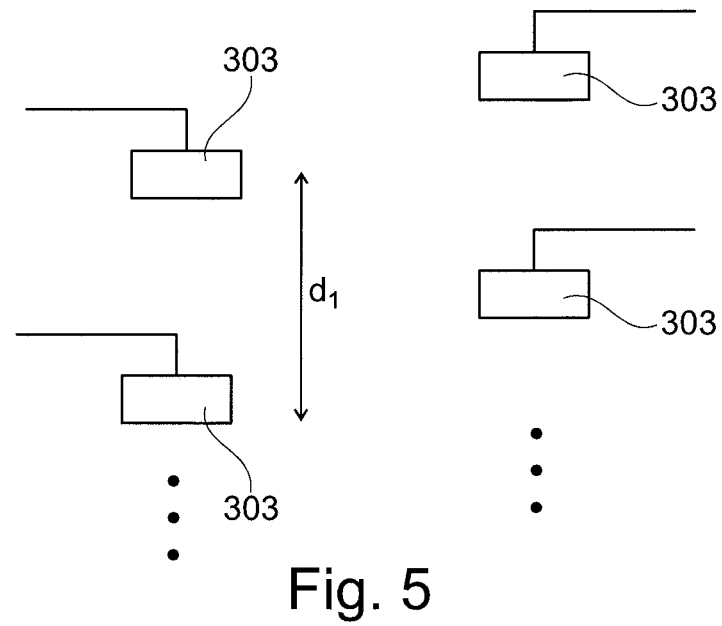
FIG. 5 is an illustration of a plurality of radiator elements arranged along two straight lines extending in parallel according to another exemplary embodiment of the present disclosure.
Figure 7:
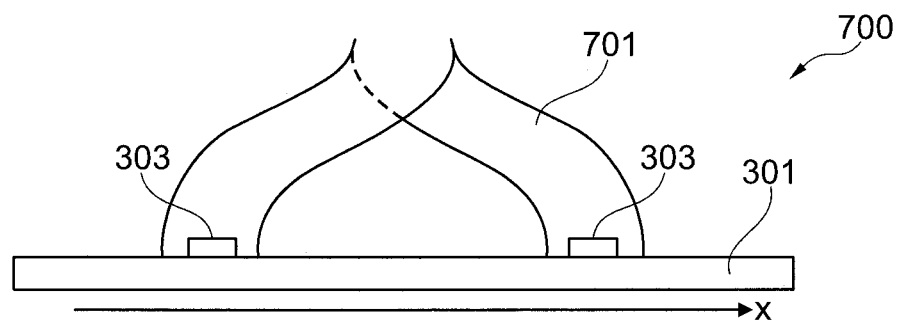
FIG. 7 is a side view of the waveguide coupling according to a further exemplary embodiment of the present disclosure.
Figure 8:
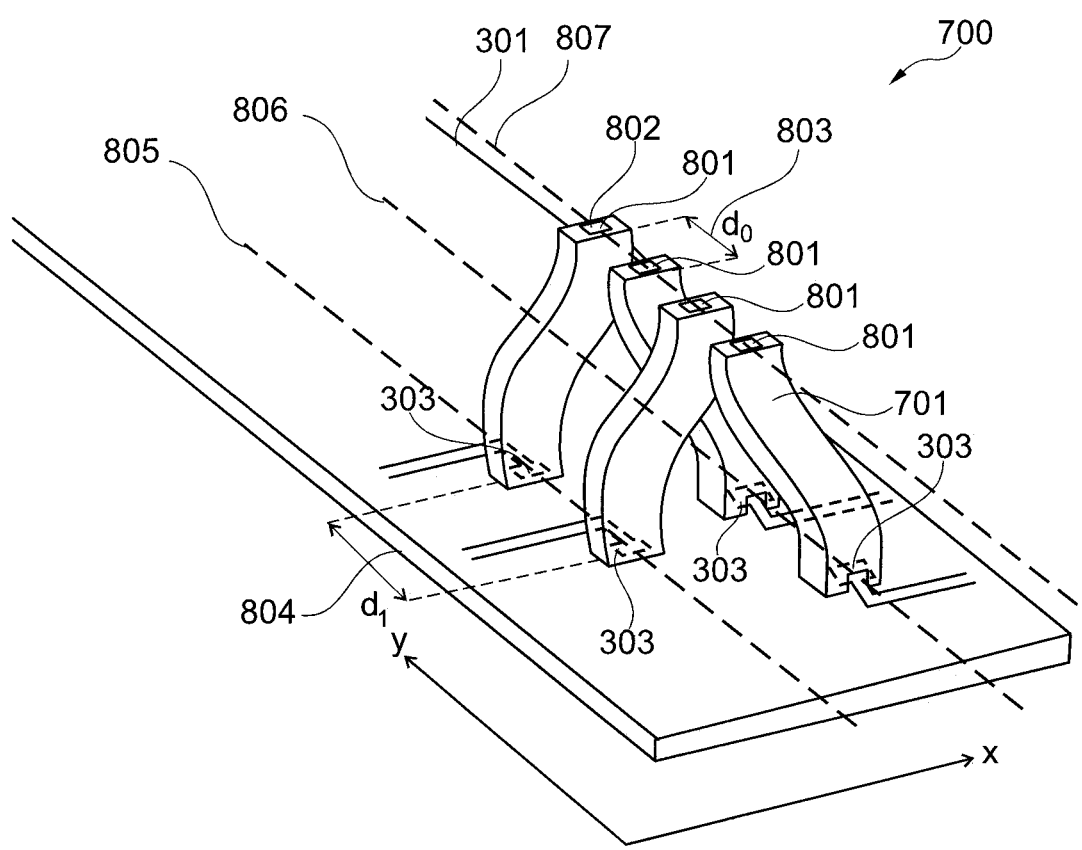
FIG. 8 is a perspective view of the exemplary waveguide coupling shown in FIG. 7.

Thus, as shown in the exemplary embodiment of FIG. 5, the radiator elements 303, for example, in the form of patch antennas, do not have to be positioned along a straight line (as illustrated in FIG. 4), and instead, so as to be mutually offset, thus along two or more straight lines, on one or more substrate materials 301. The mounted waveguides 701 (see, e.g., FIGS. 7 and 8) can be used to combine the radar signals transmitted or received by the offset radiator elements 303 along a line, whereas, the waveguides can be curved and/or angular. The resulting waveguide array can be used as an in-coupling for a wide range of antenna types, such as, e.g., a horn radiator array or a parabolic trough 201.

Using such exemplary structure, the distance between the individual microstrip line waveguide transitions 305 can be increased, and there can be an additional space for active and passive high-frequency and electronic components (see, e.g., FIGS. 4 and 5: $d_0$ ("new" distance)<=d1 ("old" distance)).

Even more space can be claimed for an individual transition 305. For example, an antenna feed assembly nevertheless be composed of waveguide openings 802 having a distance of less than or equal to $\lambda/2$.

In addition, the offset feed elements 303 can be distributed on the circuit board 301 in any exemplary manner, and can brought together into a line 801 by the waveguide openings. It is also possible for the transitions 305 to be arranged in a plurality of circuit board planes in order to obtain an increased number of usable circuit board surfaces owing to a stacked structure of the circuit board.

The cross section 304 of the waveguide can have any geometry. For a compact design, it can be advantageous for the waveguide openings 802 to have a rectangular cross section, and for the narrow sides to be arranged in a line 801, as can be shown in FIG. 8. The exemplary geometries of the cross-sectional areas can also be changed such that, for example, the round waveguides transition can be provided into rectangular waveguides.

With respect to the exemplary design/configuration and possible signal distortions, it can be advantageous to dimension the waveguides such that the propagating frequencies only excite the fundamental mode of the waveguide.

A further advantageous exemplary design/configuration can provide the bends of the waveguide being dimensioned such that the electrical field is disrupted as little as possible.

In this exemplary structure, the individual waveguides 701 should have the exact same length. Using an exemplary calibration during subsequent digital signal processing, differences in the path lengths can be removed, since they are likely known.

It is also possible to use a structure of this exemplary type in a two-dimensional antenna array, in which, e.g., the main emission direction can be pivoted in both the x- and y-direction.

An exemplary compact design of antenna elements and the HF front ends thereof can thus be utilized. With respect to the digital beamforming, e.g., the antenna elements can have a precisely defined spatial distance. This exemplary space can be inversely proportional to the frequency range of the radar device used, and thus such space can only be limited at high frequencies. Exemplary embodiments of the present disclosure can facilitate a larger region, on which electronic components can be housed.

Figure 9:
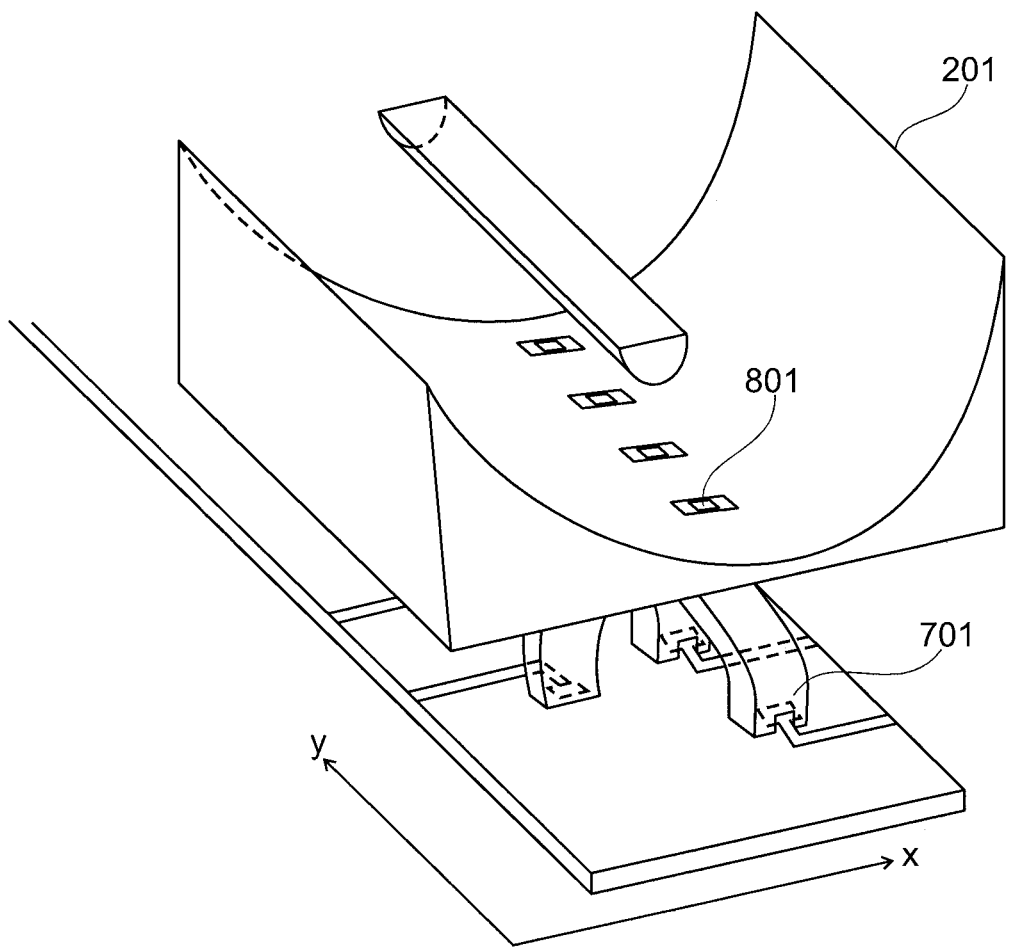
FIG. 9 is an illustration of a parabolic trough according to another exemplary embodiment of the present disclosure.
Figure 10:
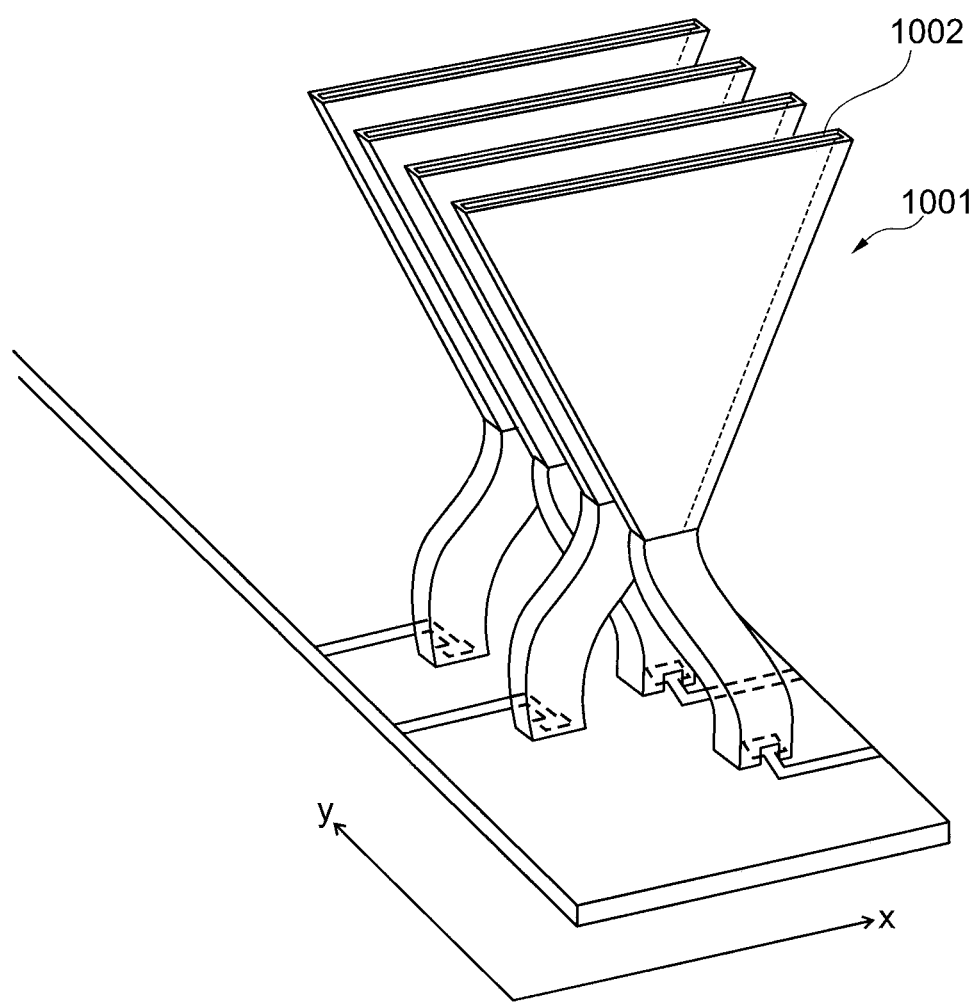
FIG. 10 is an illustration of a horn antenna array assembly according to one embodiment of the present disclosure.

FIG. 9 shows a parabolic trough comprising a waveguide coupling as described above, according to an exemplary embodiment of the present disclosure. FIG. 10 shows a one-dimensional horn array antenna 1001 comprising horn antennas 1002 mounted on the waveguide openings on the antenna side according to an exemplary embodiment of the present disclosure. For example, using the parabolic trough of the antenna from FIG. 9 or the horn antennas from FIG. 10, the transmission beam can be focused in the transverse direction (e.g., x-direction).

It should be noted that "comprising" and "having" do not exclude the possibility of other elements or steps, and "one" or "a" does not exclude the possibility of a plurality. It should further be pointed out that features or steps described with reference to one of the described exemplary embodiments may also be used in combination with other features, procedure or steps of other above-described exemplary embodiments. Reference numerals in the claims should not be treated as limiting.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly being incorporated herein in its entirety.

The invention claimed is:

1. A waveguide coupling configuration for a fill level radar antenna, comprising:
   a plurality of radiator elements, each of the radiator elements being configured to at least one of transmit or receive a radar signal; and
   a plurality of waveguides, one of the waveguides being provided for each of the radiator elements, and configured to transmit or receive the radar signal to or from the corresponding one of the radiator elements to an antenna element of an antenna assembly,
   wherein the antenna assembly comprises a plurality of antenna elements, each of the antenna elements being configured to at least one of emit or receive one of the radar signals towards or from a filling material, respectively,
   wherein each of the waveguides comprises a waveguide opening on an antenna side of the antenna assembly,
   wherein a distance between at least two adjacent openings is less than or equal to one half of a wavelength of the respective radar signal, and
   wherein a distance between at least two adjacent radiator elements is greater than one half of a wavelength of the respective radar signal.

2. The waveguide coupling configuration according to claim 1, herein a distance between adjacent ones of the radiator elements is twice as great as a distance between adjacent ones of waveguide openings of the waveguides on an antenna side of the antenna assembly.

3. The waveguide coupling configuration according to claim 1, wherein every second one of the radiator elements is arranged along a first straight line, and wherein remaining ones of the radiator elements are arranged along a second line extending in parallel with respect to the first line.

4. The waveguide coupling configuration according to claim 1, wherein the radiator elements are arranged at least partially on different planes with respect to one another.

5. The waveguide coupling configuration according to claim 1, wherein the waveguide openings on an antenna side of the antenna assembly are arranged along a line.

6. The waveguide coupling configuration according to claim 1, wherein at least one of the waveguides is a curved or angular waveguide, wherein at least one of the radiator elements associated with a respective one of the waveguides is not arranged directly below a waveguide opening on an antenna side of the antenna assembly, and arranged is laterally offset with respect thereto.

7. A fill level radar antenna comprising:
   a waveguide coupling configuration for a fill level radar antenna, comprising:
   a. a plurality of radiator elements, each of the radiator elements being configured to at least one of transmit or receive a radar signal; and
   b. a plurality of waveguides, one of the waveguides being provided for each of the radiator elements, and configured to transmit or receive the radar signal to or from the corresponding one of the radiator elements to an antenna element of an antenna assembly, wherein the antenna assembly comprises a plurality of antenna elements, each of the antenna elements being configured to at least one of emit or receive one of the radar signals towards or from a filling material, respectively, wherein each of the waveguides comprises a waveguide opening on an antenna side of the antenna assembly, wherein a distance between at least two adjacent openings is less than or equal to one half of a wavelength of the respective radar signal, and wherein a distance between at least two adjacent radiator elements is greater than one half of a wavelength of the respective radar signal.

8. The fill level radar antenna according to claim 7, wherein the level radar antenna has a configuration of a horn radiator array antenna.

9. The fill level radar antenna according to claim 7, wherein the level radar antenna has a configuration of a parabolic trough.

10. The fill level radar antenna according to claim 7, wherein the level radar antenna has a configuration of a one-dimensional array antenna.

11. The fill level radar antenna according to claim 7, wherein the level radar antenna has a configuration of a two-dimensional array antenna.

12. A fill level measurement device comprising a fill level radar antenna which comprises:

a waveguide coupling configuration for a fill level radar antenna, comprising:

a. a plurality of radiator elements, each of the radiator elements being configured to at least one of transmit or receive a radar signal; and b. a plurality of waveguides, one of the waveguides being provided for each of the radiator elements, and configured to transmit or receive the radar signal to or from the corresponding one of the radiator elements to an antenna element of an antenna assembly, wherein the antenna assembly comprises a plurality of antenna elements, each of the antenna elements being configured to at least one of emit or receive one of the radar signals towards or from a filling material, respectively, wherein each of the waveguides comprises a waveguide opening on an antenna side of the antenna assembly, wherein a distance between at least two adjacent openings is less than or equal to one half of a wavelength of the respective radar signal, and wherein a distance between at least two adjacent radiator elements is greater than one half of a wavelength of the respective radar signal.

13. The fill level measurement device according to claim 12, wherein the fill level measurement device is configured to determine a topology of a surface of the filling material.

* * * * *